(12) United States Patent
Cody et al.

(10) Patent No.: US 7,628,545 B2
(45) Date of Patent: Dec. 8, 2009

(54) FIBER OPTIC PLUG ASSEMBLY WITH BOOT AND CRIMP BAND

(75) Inventors: Joseph Todd Cody, Hickory, NC (US); James Phillip Luther, Hickory, NC (US); Christopher Paul Lewallen, Hudson, NC (US); Thomas Theuerkorn, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/820,277

(22) Filed: Jun. 18, 2007

(65) Prior Publication Data
US 2008/0310798 A1    Dec. 18, 2008

(51) Int. Cl.
*G02B 6/38* (2006.01)
*G02B 6/36* (2006.01)

(52) U.S. Cl. .............................. 385/69; 385/55; 385/56; 385/76; 385/77; 385/78; 385/86; 385/87

(58) Field of Classification Search ................... 385/69, 385/86, 87
See application file for complete search history.

(56) References Cited

U.S. PATENT DOCUMENTS

| | | | | | |
|---|---|---|---|---|---|
| 4,047,797 | A | | 9/1977 | Arnold et al. ............. | 350/96 C |
| 5,202,942 | A | * | 4/1993 | Collins et al. ............. | 385/87 |
| 5,781,681 | A | * | 7/1998 | Manning ................... | 385/86 |
| 5,835,653 | A | * | 11/1998 | Barkus ...................... | 385/87 |
| 6,130,983 | A | | 10/2000 | Cheng ....................... | 385/139 |
| 6,134,370 | A | | 10/2000 | Childers et al. ........... | 385/135 |
| 6,178,283 | B1 | * | 1/2001 | Weigel ...................... | 385/139 |

(Continued)

FOREIGN PATENT DOCUMENTS

EP    0375669    6/1990

(Continued)

OTHER PUBLICATIONS

Patent Cooperation Treaty, International Search Report for International Application No. PCT/US2008/007343, May 12, 2009, 2 pages.

*Primary Examiner*—Ryan Lepisto (57) ABSTRACT

A fiber optic plug assembly of a fiber optic connector assembly is provided and generally includes a fiber optic plug mounted upon an end of a fiber optic cable; a pre-molded boot placed over the fiber optic plug and the fiber optic cable; and a crimp band mated over the pre-molded boot to secure the boot to the fiber optic cable; wherein the fiber optic plug assembly is operable to mate to a fiber optic receptacle. The plug assembly eliminates the need for an overmolded boot. Further, the present invention eliminates the need to perform a heat shrink between the buffer tube and crimp body through the internal O-ring. The plug assembly meets the standards of GR-3120-CORE while at the same time providing a simpler hardware package that can be assembled with ordinary connectorization tools.

12 Claims, 7 Drawing Sheets

U.S. PATENT DOCUMENTS

| | | | |
|---|---|---|---|
| 6,601,997 B2 * | 8/2003 | Ngo | 385/86 |
| 6,674,951 B1 | 1/2004 | Erwin et al. | 385/134 |
| 6,796,721 B2 * | 9/2004 | Matsumoto et al. | 385/86 |
| 6,817,780 B2 * | 11/2004 | Ngo | 385/86 |
| 6,932,515 B2 | 8/2005 | Ngo | 385/86 |
| 7,018,108 B2 * | 3/2006 | Makhlin et al. | 385/78 |
| 7,150,567 B1 * | 12/2006 | Luther et al. | 385/78 |
| 2002/0150352 A1 * | 10/2002 | Ngo | 385/86 |
| 2003/0095754 A1 * | 5/2003 | Matsumoto et al. | 385/86 |
| 2004/0120656 A1 * | 6/2004 | Banas et al. | 385/86 |

FOREIGN PATENT DOCUMENTS

| | | |
|---|---|---|
| EP | 1431786 | 6/2004 |
| JP | 2004-287219 | 10/2004 |

* cited by examiner

FIBER OPTIC PLUG ASSEMBLY WITH BOOT AND CRIMP BAND

CROSS-REFERENCE TO RELATED APPLICATION(S)

This Application incorporates by reference in its entirety for all purposes commonly assigned U.S. patent application Ser. No. 10/924,525 filed Aug. 24, 2004, and entitled "FIBER OPTIC RECEPTACLE AND PLUG ASSEMBLIES." Furthermore, this Application incorporates by reference in its entirety for all purposes commonly assigned U.S. patent application Ser. No. 11/076,684 filed Mar. 10, 2005, and entitled "MULTI-FIBER FIBER OPTIC RECEPTACLE AND PLUG ASSEMBLY."

BACKGROUND OF THE INVENTION

1. Field of the Invention

The present invention relates generally to fiber optic connector assemblies, and more specifically, to fiber optic connector assemblies with a field-installable crimp-on boot and an O-ring on a plug assembly for interconnecting optical fibers within a fiber optic communications network.

2. Technical Background of the Invention

Optical fiber is increasingly being used for a variety of broadband applications including voice, video and data transmissions. As a result of the desire to expand telecommunications networks, larger networks require a greater number of distribution cables, drop cables, assemblies and connecting hardware. One example of connecting hardware includes plug assemblies, also referred to herein as "connector assemblies", which are used to connect optical fibers through receptacles, optical devices, hardware or other plugs. Plug assemblies typically comprise the hardware mounted upon the end of a fiber optic drop cable and typically include at least one ferrule mounted upon the ends of one or more optical fibers for presenting the one or more fibers for optical connection with other optical fibers.

In addition to the foregoing, certain requirements have been established for connector assemblies and the like. Specifically, GR-3120-CORE, Issue 1, March 2005, *Generic Requirements for Hardened Fiber Optic Connectors (HFOCs)*, issued by Telcordia Technologies, Inc. of Piscataway, N.J., contains requirements for connectors that are field-mateable and hardened (also known as ruggerdized) for use in the outside plant. These requirements are needed to support FTTx deployment and service offerings. GR-3120-CORE includes generic requirements for HFOCs for passive telecommunications components used in an Outside Plant (OSP) environment. HFOCs provide drop connections to customers from fiber distribution networks, such as FTTx, and may be provided in pedestal closures, aerial and buried closures, or equipment located at a customer premises, such as a Fiber Distribution Hub (FDH) or optical network termination unit. Through the GR-3120-CORE specifications, HFOCs are specified to withstand climatic conditions including ambient temperatures ranging from −40° C. (−40° F.) to +70° C. (158° F.).

To meet the demanding GR-3120-CORE specifications, smaller conventional connector assembly packages are needed by network providers. These connector assembly packages typically include an overmolded boot, glue body based solution or a heat shrink seal. The heat shrink seal has increased cost and is not as robust as an overmolded boot. Overmolded boots are known in the art for sealing the rear end of the plug housing and for providing strain relief. For example, the plug assembly can include a high-pressure overmolded boot made of a flexible (e.g., silicone-type or the like) material secured over a rear portion of the plug assembly and a portion of the drop cable in order to seal the exposed portion of the drop cable while generally inhibiting kinking and providing bending strain relief to the drop cable near the plug. A glue body material is injected between a buffer tube and a crimp body, but leakage occurs due to shrinkage of the material. Additionally, the overmolded boot material is very stiff to meet the GR-3120-CORE side load requirement, thus the overmolded boot material melt temperatures are high, resulting in damage to the buffer tube further complicating sealing when the overmolded boot, crimp body, and buffer tube are heated to form a seal.

The overmolded boot, crimp body, and the like provide a robust mechanical and seal integrity performance for the connector assembly to meet the GR-3120-CORE specifications in a smaller connector assembly. These solutions are provided in factory assembly. However, these solutions are not simple to execute in a typical cable assembly house or in the field. What is needed, therefore, is a simpler hardware package that can be assembled with ordinary connectorization tools. It would also be desirable to provide a simpler hardware package for a fiber optic connector and plug assembly which meets the demanding GR-3120-CORE specification. Such fiber optic connector and plug assemblies would desirably be provided with a crimp on pre-molded boot and O-ring between a buffer tube on a drop cable and a crimp body in the plug assembly.

BRIEF SUMMARY OF THE INVENTION

To achieve the forgoing and other objects, and in accordance with the purposes of the present invention as embodied and broadly described herein, the present invention provides various embodiments of a fiber optic plug assembly and plug assembly components including a crimp-on pre-molded boot and O-ring between a buffer tube on a drop cable and a crimp body in the plug assembly. Advantageously, the present invention eliminates an overmolded boot, providing a more readily installed plug assembly. Further, the present invention eliminates the need to perform a heat shrink between the buffer tube and crimp body by using an internal O-ring. The present invention does not require significant investments in molds and presses to install the connector assembly. The plug assembly of the present invention meets the demanding standards specified in GR-3120-CORE while at the same time providing a more simple hardware package that can be assembled with ordinary tools.

In one exemplary embodiment, the present invention provides a hardened fiber optic plug assembly including: a fiber optic plug mounted upon an end of a fiber optic cable, a pre-molded boot placed over the fiber optic plug and the fiber optic cable, and a crimp band mated over the pre-molded boot to secure the boot to the fiber optic cable, wherein the fiber optic plug assembly is operable to mate to a fiber optic receptacle, fiber optic plug or other hardware or device. The hardened fiber optic plug assembly further includes a buffer tube at the end of the fiber optic cable, an O-ring located on the buffer tube, and an O-ring pusher tube located on the buffer tube behind the O-ring relative to the end of the fiber optic cable, wherein the pusher tube is operable to seat the O-ring between the buffer tube and a crimp body created by the crimp band and pre-molded boot. The O-ring is operable to seal the plug assembly, and wherein the O-ring pusher tube provides protection for the buffer tube. The plug assembly substantially meets GR-3120-CORE specifications. Optionally, the pre-molded boot includes rubber or other elastomeric material, and the crimp band includes brass or other deformable material. The boot and crimp band together provide sealing and strain relief such that the plug assembly substantially meets GR-3120-CORE specifications. The hardened fiber optic plug assembly further includes a stamped metallic strength element engaged between the crimp band and the pre-molded boot. Optionally, the stamped metallic strength element is made to the pre-molded boot.

In another exemplary embodiment, the present invention provides a hardened fiber optic plug assembly including: a buffer tube upon an end of a fiber optic cable, a plug sub-assembly mounted upon the end of the fiber optic cable over the buffer tube, an O-ring located on the buffer tube, and an O-ring pusher tube located on the buffer tube behind the O-ring relative to the end of the fiber optic cable, wherein the pusher tube is operable to seat the O-ring between the buffer tube and the plug sub-assembly. Optionally, the hardened fiber optic plug assembly further includes a pre-molded boot placed over the fiber optic plug and the fiber optic cable, and a crimp band mated over the pre-molded boot to secure the boot to the fiber optic cable. Alternatively, the hardened fiber optic plug assembly further includes a high-pressure overmolded boot secured over a rear portion of the plug assembly and an end of a fiber optic cable, and a glue body material injected between the buffer tube and a crimp body. The plug assembly substantially meets GR-3120-CORE specifications.

In yet another exemplary embodiment, the present invention provides a fiber optic plug assembly including: a plug sub-assembly mated to a plurality of optical fibers in a fiber optic cable, a plug outer housing located substantially over the plug sub-assembly, a pre-molded boot located substantially over the plug sub-assembly and the fiber optic cable, and a crimp band mated over the pre-molded boot to secure the boot to the fiber optic cable and to seal the fiber optic plug. The plug assembly substantially meets GR-3120-CORE specifications. The fiber optic plug assembly further includes a coupling nut located over the plug outer house and operable to mate with a fiber optic receptacle. The outer housing includes a key slot for aligning the plug with the receptacle. Optionally, the fiber optic plug assembly further includes a buffer tube at the end of the fiber optic cable, an O-ring located on the buffer tube, an O-ring pusher tube located on the buffer tube behind the O-ring relative to the end of the fiber optic cable, wherein the pusher tube is operable to seat the O-ring between the buffer tube and a crimp body created by the crimp band and pre-molded boot. The O-ring is operable to seal the plug assembly, and wherein the O-ring pusher tube provides protection for the buffer tube. Optionally, the boot is provided with a port for introducing adhesive. Optionally, splines are added to the large inner diameter of the slide-up boot to prevent adhesive from flowing during its liquid stage.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the detailed description, serve to explain the principles and operations thereof.

BRIEF DESCRIPTION OF THE DRAWINGS

The present invention is illustrated and described herein with reference to the various drawings, in which like reference numbers denote like components, and in which.

DETAILED DESCRIPTION OF THE INVENTION

The present invention will now be described more fully hereinafter with reference to the accompanying drawings in which exemplary embodiments of the invention are shown. However, this invention may be embodied in many different forms and should not be construed as limited to the embodiments set forth herein. These exemplary embodiments are provided so that this disclosure will be both thorough and complete, and will fully convey the scope of the invention to those skilled in the art.

In the various embodiments described below, the present invention provides a crimp-on pre-molded boot and O-ring between a buffer tube on a drop cable and a crimp body in the plug assembly of a fiber optic connector assembly. Advantageously and in various exemplary embodiments described herein, the present invention eliminates an overmolded boot, providing a simpler to install connector assembly. Further, the present invention eliminates the need to perform a heat shrink between the buffer tube and crimp body by using an internal O-ring. The present invention does not require significant investments in molds and presses to install the connector assembly. The plug assembly of the present invention meets the demanding standards specified in GR-3120-CORE while at the same time providing a simpler hardware package that can be assembled with ordinary connectorization tools. Other improvements as a result of the structural changes include improvements with respect to optical fiber alignment and connectivity within and between drop cables and a subscriber's premises. Thus, the present invention provides a plug assembly designed to readily interconnect and align optical fibers while providing relief against mechanical forces.

The present invention also provides improvements in sealing. The most difficult seal to achieve is between the buffer tube and crimp body. This can be sealed through a heat shrink, but this is difficult and requires a flash test to verify. The present invention provides an O-ring between the buffer tube and the crimp body. This O-ring is most advantageously positioned through the use of a short section of tubing behind the O-ring. This provides accurate control over sealing and provides additional protection for the buffer tube at the transition point to the connector body.

Referring now to FIGS. 1-8, a fiber optic plug 10 assembly operable for use with a fiber optic connector assembly is illustrated in accordance with in exemplary embodiment of the present invention. As shown, the fiber optic plug 10 includes components such as an outer housing 12, an alignment sleeve 14, a plug sub-assembly 16 for maintaining a plug ferrule (not shown), a lengthwise passage 18, a crimp band 20, a pre-molded boot 30, and a coupling nut 28. The plug is mounted upon the end of a fiber optic cable, such as a drop cable 50. Although not shown, the plug 10 may be mated to a fiber optic receptacle. The plug 10 and the receptacle are operable for aligning and maintaining the optical fiber in opposing relation for transmitting an optical signal.

Figure 1:
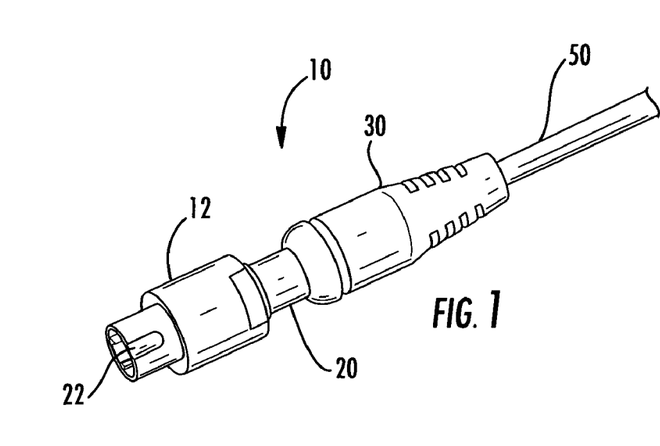
FIG. 1 is a perspective view of one embodiment of a plug assembly including a pre-molded boot and crimp band.

To secure the plug 10 to a receptacle, a threaded coupling nut engages a threaded end of the receptacle or vice-versa. The plug 10 includes the pre-molded boot 30 and crimp band 20. To eliminate the overmolded boot in conventional plugs, a simple slide-on boot is not possible due to the 10-15 lbs. side load requirement in GR-3120-CORE, and the tendency of slip-on boots to bell mouth and provide reduced support for the drop cable assembly. The pre-molded boot 30 is placed upon the end of the drop cable 50. The pre-molded boot 30 can be made of a flexible (silicone-type or the like) material and is provided for sealing the exposed portion of the drop cable while generally inhibiting kinking and providing bending strain relief to the cable. Although not shown, the end of the drop cable 50 includes a stripped back cable jacket, strength components, and one or more fibers such as an optical ribbon comprising a plurality of optical fibers 54. The crimp band 20 is placed over the pre-molded boot 30 and the drop cable 50, and crimped using ordinary tools to secure the boot 30 to the drop cable 50. Accordingly, the crimp band 20 secures the pre-molded boot 30 in place over the drop cable 50. The crimp band 20 can be made of brass or another suitable deformable material. In addition to sealing and securing the pre-molded boot 30, the crimp band 20 also provides strain relief for the drop cable 50. Also, the end of the outer housing 12 includes a key slot 22 for aligning the plug 10 with the receptacle, and consequently, the plug sub-assembly 16 relative to the receptacle, and also providing selective mating. Thus, the plug 10 and corresponding receptacle are configured to permit mating in only one orientation.

Figure 2:
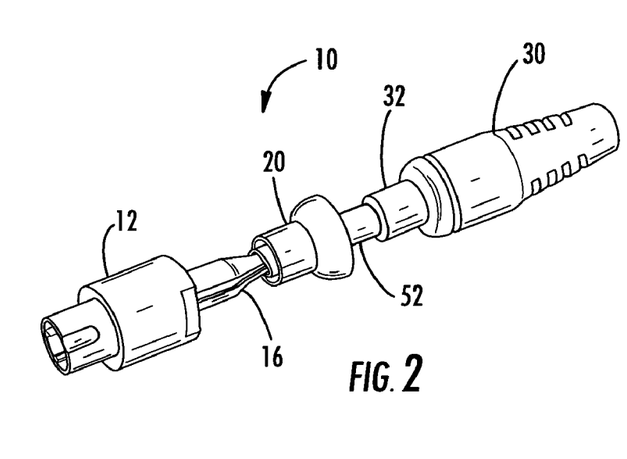
FIG. 2 is a perspective view of the plug assembly in FIG. 1 shown with the crimp band disengaged from the pre-molded boot.

Referring to FIG. 2, the fiber optic plug 10 is shown with the pre-molded boot 30, crimp band 20, outer housing 12, and plug sub-assembly 16 disengaged. The pre-molded boot 30 is placed over the drop cable 50. The plug sub-assembly 16 is assembled by crimping the crimp band 20 around a rear knurled portion. As is well understood by those of ordinary skill in the art, the outer housing 12 and a coupling nut 28 (depicted in FIGS. 7-8) are threaded onto the drop cable 50 before the sub-assembly 16. The outer housing 12 is then slid over the sub-assembly 16. In one embodiment, the pre-molded boot 30 and the crimp band 20 are separate components. In another embodiment, the pre-molded boot 30 and the crimp band 20 could be a boot insert molded onto a mandrel. The mandrel would in turn be crimped to the back of the connector to provide adequate boot retention and resistance to bell mouthing. The pre-molded boot 30 defines a forward end 32 positioned about a buffer tube 52.

Figure 3:
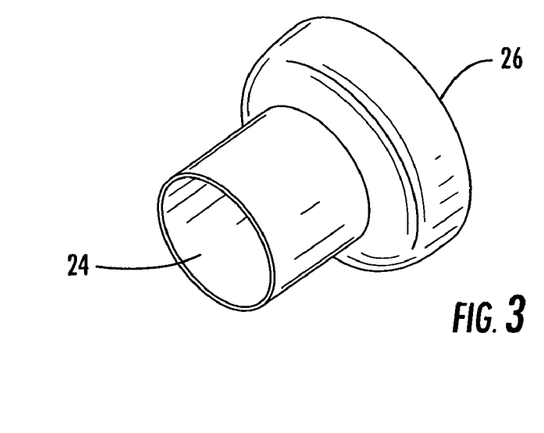
FIG. 3 is a perspective view of the crimp band in FIG. 1.

Referring to FIG. 3, in an exemplary embodiment, the crimp band 20 includes a forward end 24 and a rearward end 26. The forward end 24 includes a passageway sized to fit over the plug sub-assembly 16 and the end of the drop cable 50. The rearward end 26 includes a passageway sized to fit over a forward end 32 of the pre-molded boot 30.

Figure 4:
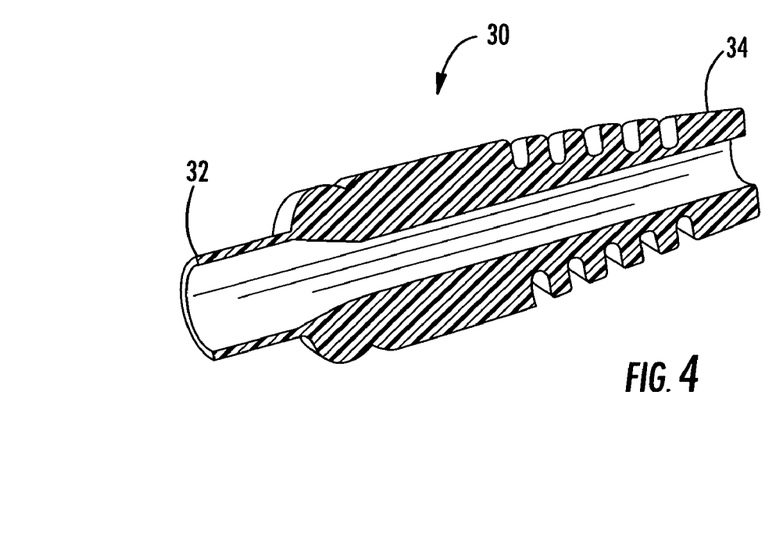
FIG. 4 is a cross-sectional view of the pre-molded boot in FIG. 1.

Referring to FIG. 4, in an exemplary embodiment, the pre-molded boot 30 includes the forward end 32 and a rearward end 34. The forward end 32 includes a passageway sized to fit over the plug sub-assembly 16 and the end of the drop cable 50. The rearward end 34 includes a passageway sized to fit over the drop cable 50.

Figure 5:
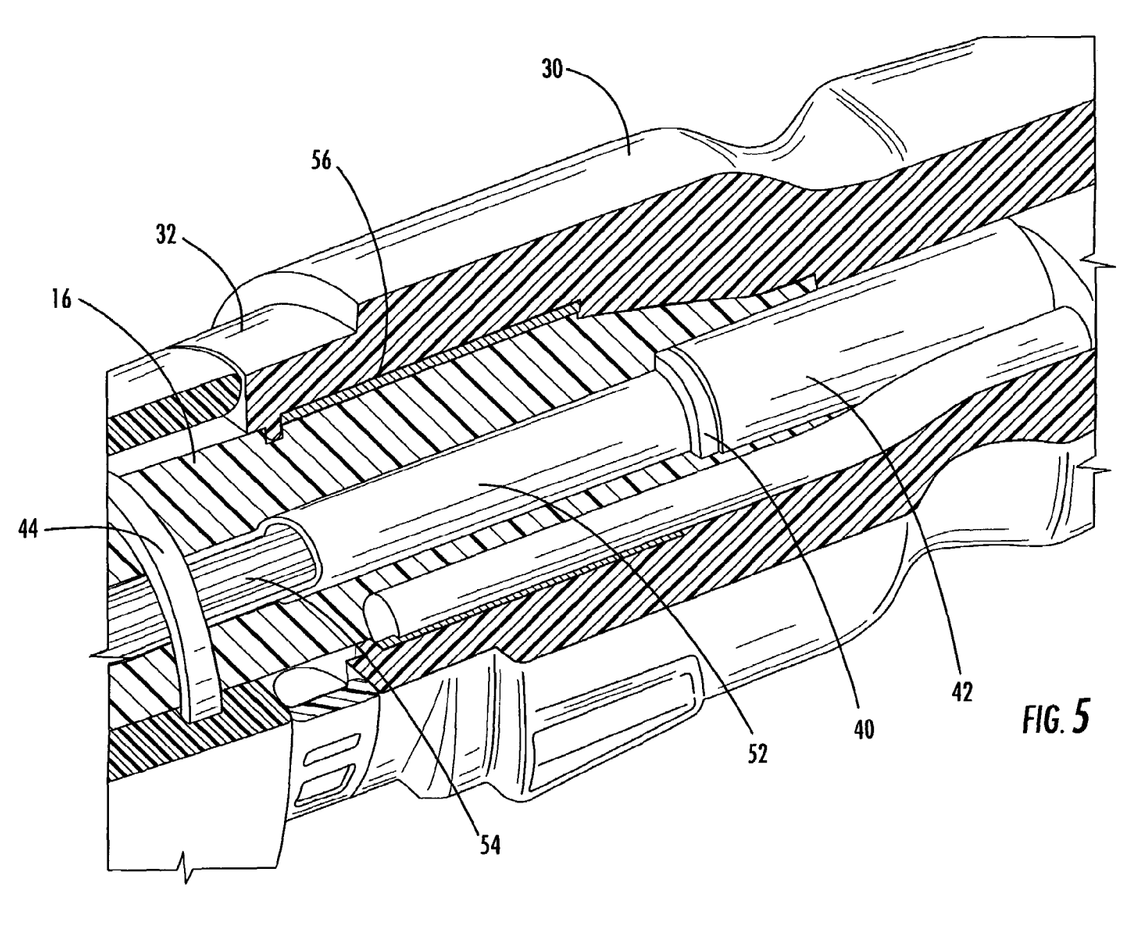
FIG. 5 is a cross-sectional view of the plug assembly in FIG. 1 including an internal O-ring between the crimp body and a buffer tube.

Referring to FIG. 5, a cut-away of the plug 10 assembly is shown with an internal O-ring 40. For environmental reasons, the plug 10 must be sealed between a buffer tube 52 at the end of the drop cable 50 and a crimp body portion of the pre-molded boot 30. The crimp body portion is where the crimp band 20 secures the pre-molded boot 30. The buffer tube 52 includes an opening with a plurality of optical fibers 54 which are mated to the plug sub-assembly 16. As described herein, conventionally this seal is done with a heat shrink followed by a flash test to verify the seal. The present invention provides an internal O-ring 40 and an O-ring pusher 42 between the buffer tube 52 and the crimp body. The O-ring 40 is positioned by the O-ring pusher 42 which is a short section of tubing located behind the O-ring 40 on the buffer tube 52. The O-ring pusher 42 provides accurate control over seating of the O-ring 40, and additional protection for the buffer tube 52 at the end point of the drop cable 50 where the plug 10 attaches. Advantageously, the use of the O-ring 40 to seal the buffer tube 52 is better than the straight injection molding approach. Compared to the use of heat shrink in the plug assembly 10, the O-ring 40 eliminates an expensive operation and complex operation. This can eliminate the need to test for leaks in the plug assembly 10.

To further protect the buffer from damage, a strength component 56, such as glass-reinforced plastic (GRP) or the like, is included between the plug sub-assembly 16 and the crimp body. The O-ring 40 of the present invention can also be utilized in an overmolded boot connector assembly. The O-ring 40 could be combined with an overmolded boot to provide additional robustness. This can eliminate the flash test, but would still require the use of a conventional glue body. Specifically, the O-ring pusher 42 provides not only a placement tool, but a thermal barrier as well. The pusher 42 allows the use of a high melt temperature. Additionally, to solve the buffer tube 52 damage due to the heat and pressure of the injection molding process, the tubing was changed to Teflon or the like based product with a high melt temperature. This O-ring 40 and O-ring pusher 42 solution can be utilized in any hardened connector.

The outer housing 12 of the plug 10 may further define a shoulder that servers as a mechanical stop for a conventional elastrometric O-Ring 44 against a forward radial surface thereof and for the coupling nut 28 against a rearward radial surface thereof. This O-Ring 44 provides another environmental seal when the coupling nut 28 engages a threaded portion of the receptacle.

Figure 6:
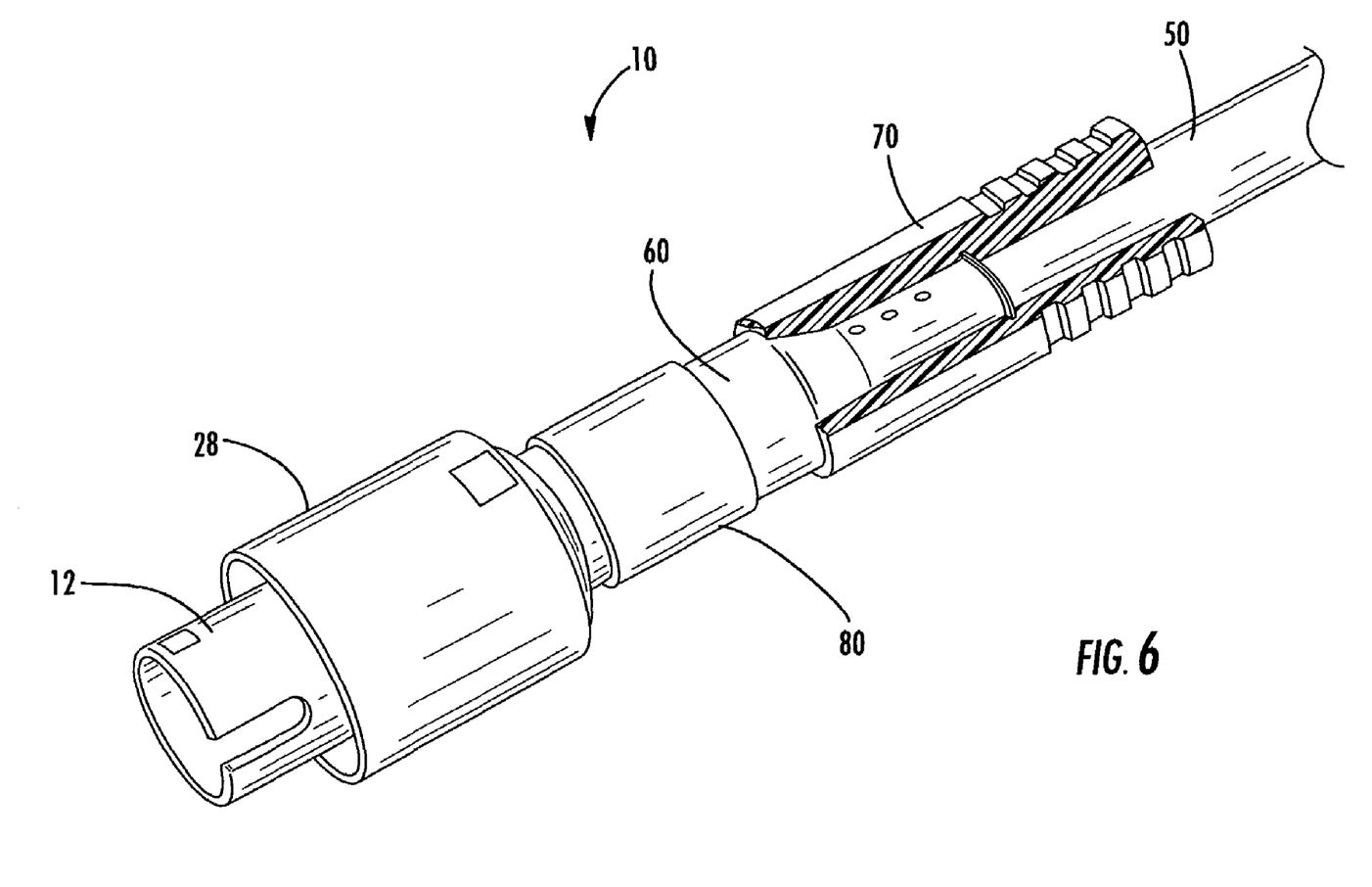
FIG. 6 is a cut-away perspective view of a plug assembly including a stamped metallic strength element engaged between the crimp band and the pre-molded boot.

Referring to FIG. 6, in another exemplary embodiment, a cut-away perspective view of the plug assembly 10 including a stamped metallic strength element 60 engaged between a crimp band 80 and a molded rubber boot 70 is shown. The strength element 60 includes a rolled edge to prevent the molded rubber boot 70 from pulling off. The molded rubber boot 70 is made to the metallic strength element 60 and placed onto the plug 10 and drop cable 50 as a single assembly. The crimp band 80 is placed over a frontward portion of the metallic strength element 60 and the outer housing 12, and crimped using ordinary connectorization tools. Additionally, the coupling nut 28 is shown over the outer housing 12. As described herein, the coupling nut 28 secures the plug 10 to the receptacle.

Figures 7, 8:
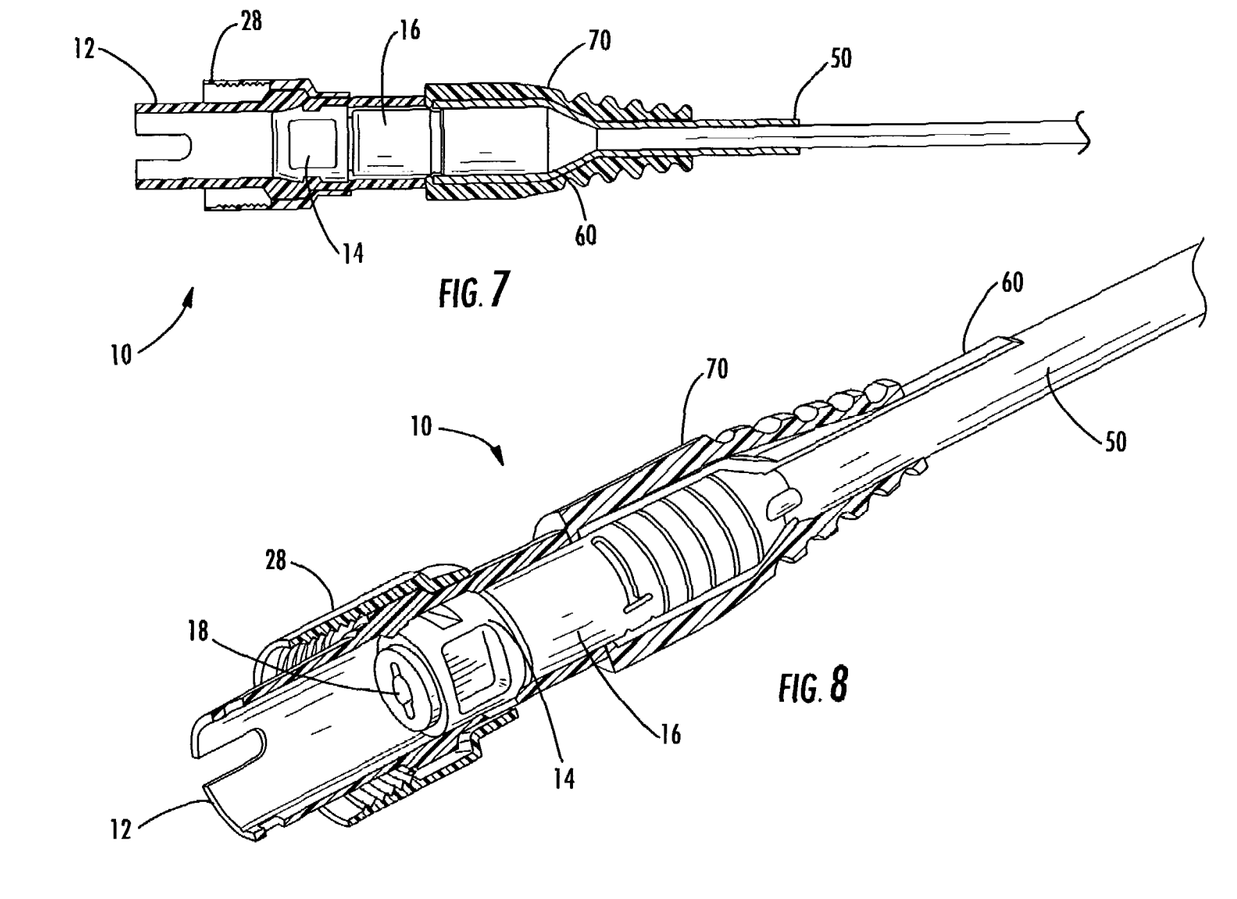
FIG. 7 is a cross-sectional view of another embodiment of a plug assembly
FIG. 8 is a cut-away perspective view of the plug assembly in FIG. 7.

Referring to FIGS. 7-8, a cross-sectional and cut-away perspective view are shown of another exemplary embodiment of the plug assembly 10. As in FIG. 6, the molded rubber boot 70 is made to the strength element 60 and placed at the end of the drop cable 50. The crimp band (not shown in FIGS. 7-8) is operable to secure the molded rubber boot 70 and the strength element 60 to the drop cable 50 thereby forming a seal and strain relief to secure the plug assembly 10. The plug sub-assembly 16 mates with the end of the drop cable 50 as described herein. The plug assembly 10 may also include the alignment sleeve 14 operable to align the optical fibers between the plug 10 and the receptacle, as well as a lengthwise passage 18 operable to receive a plug ferrule and a receptacle ferrule.

Figure 9:
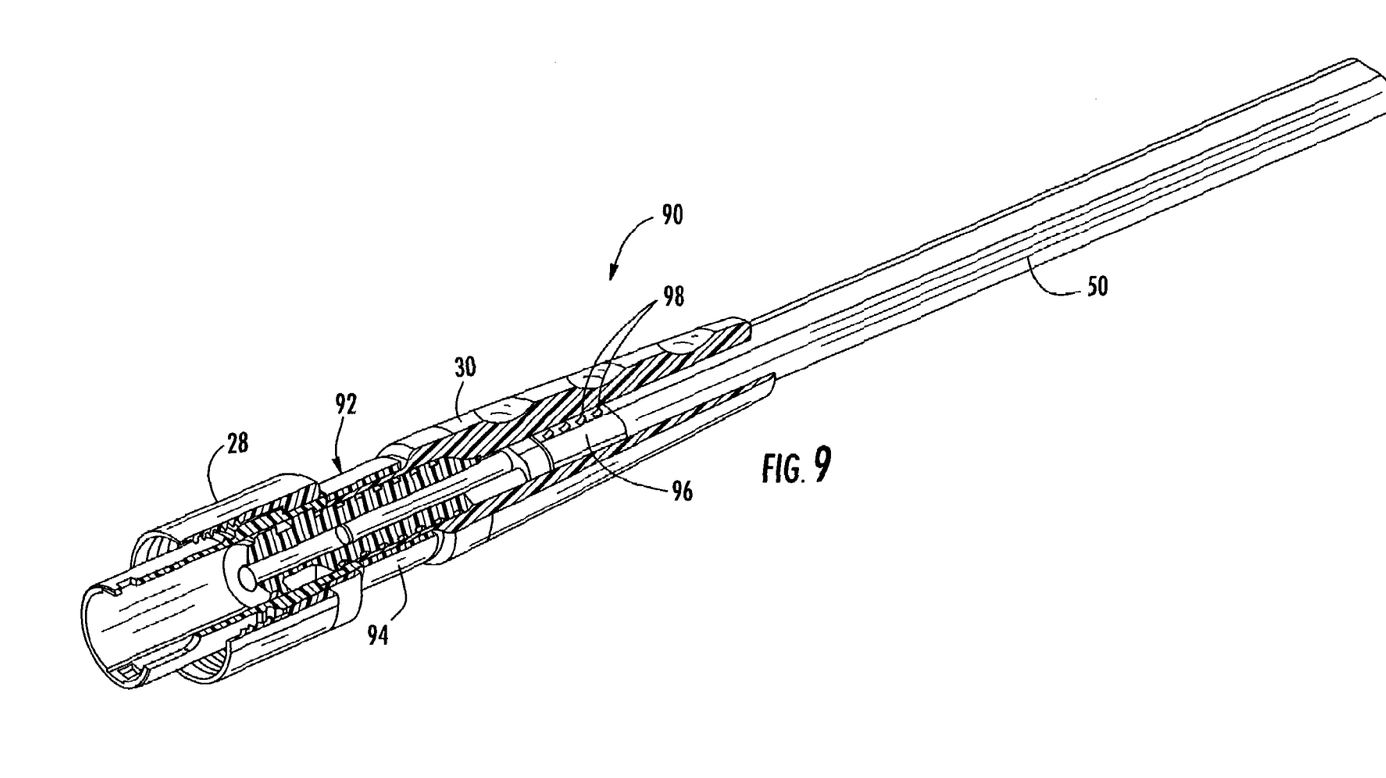
FIG. 9 is another embodiment of a plug assembly including a sheath retention feature clamped about the drop cable.

Referring to FIG. 9, a cut-away perspective view of another plug assembly is shown. The plug assembly 90 includes a preformed boot 30 defining a surface 92 for receiving a crimp band 94. The assembly further includes a sheath retention band 96 disposed about a portion of the drop cable 50 for further holding the boot 30 in position. Optionally, the retention band 96 may be notched or define grabbing portions 98 to further hold the boot 30 in position. In an alternative embodiment, the preformed boot 30 may be substituted for a heat shrink.

Figures 10, 11:
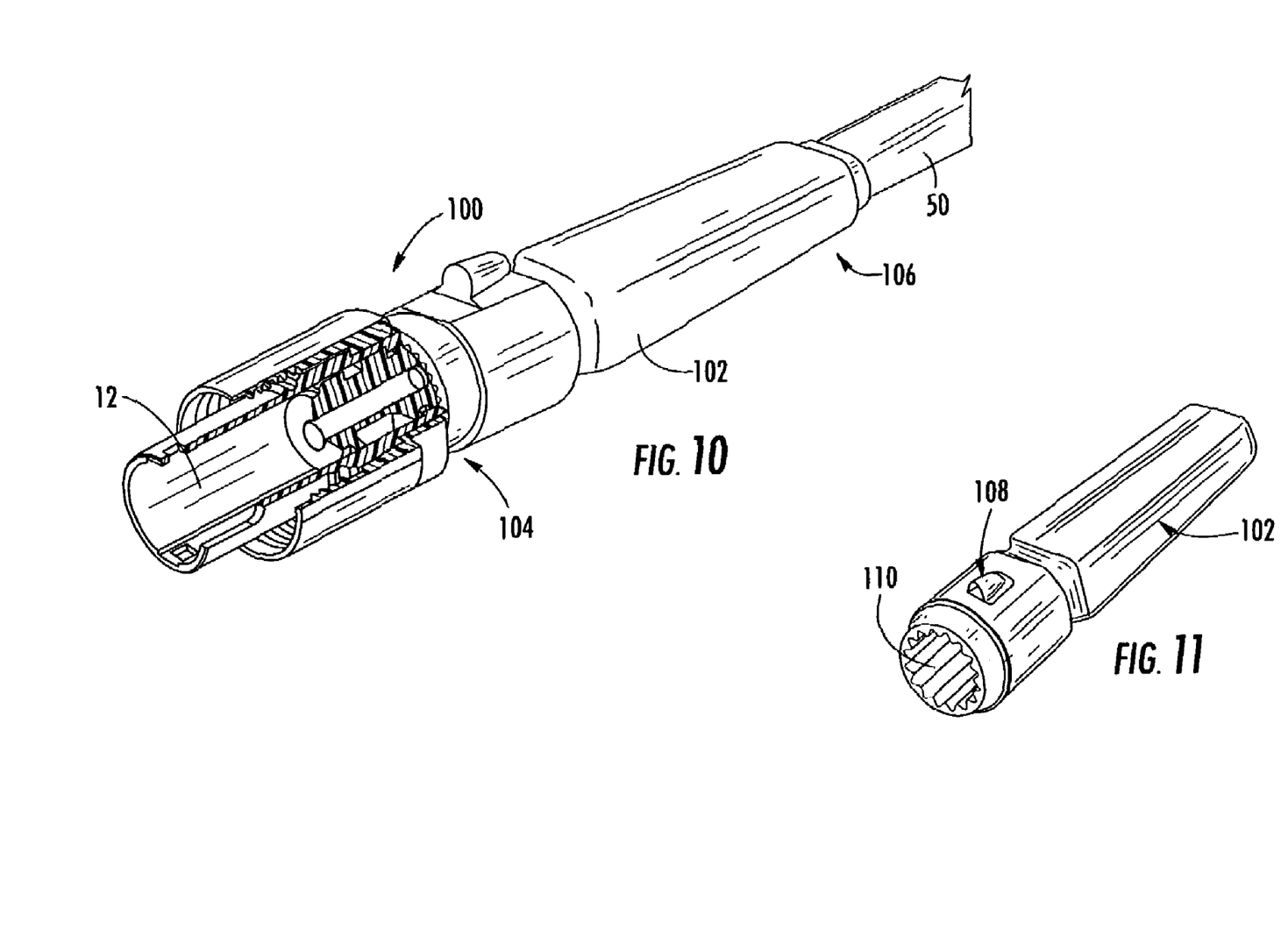
FIG. 10 is a cut-away perspective view of a plug assembly including a splined boot defining an adhesive port.
FIG. 11 is a perspective view of the splined boot of FIG. 10.

Referring to FIGS. 10 and 11, a cut-away perspective view of another embodiment of a plug assembly 100, and an isolated view of a boot 102 are shown. The assembly 100 includes, among other components, a preformed boot 102 defining a first end 104 positioned over outer housing 12 and a second end 106 positioned over a portion of the drop cable 50. As in the previous embodiments, the second end 106 of the boot 102 may define an opening that corresponds in shape to the drop cable upon which it is mounted. In the embodiment shown, the drop cable 50 is a ribbon-type cable and is non-round. The boot 102 further defines an opening 108 therethrough for introducing an epoxy, adhesive or like material for sealing. Referring specifically to FIG. 11, splines 110 may optionally be added the large inner diameter of the slide-up boot 102 to prevent adhesive from flowing during liquid stage of the adhesive.

Figures 12, 13:
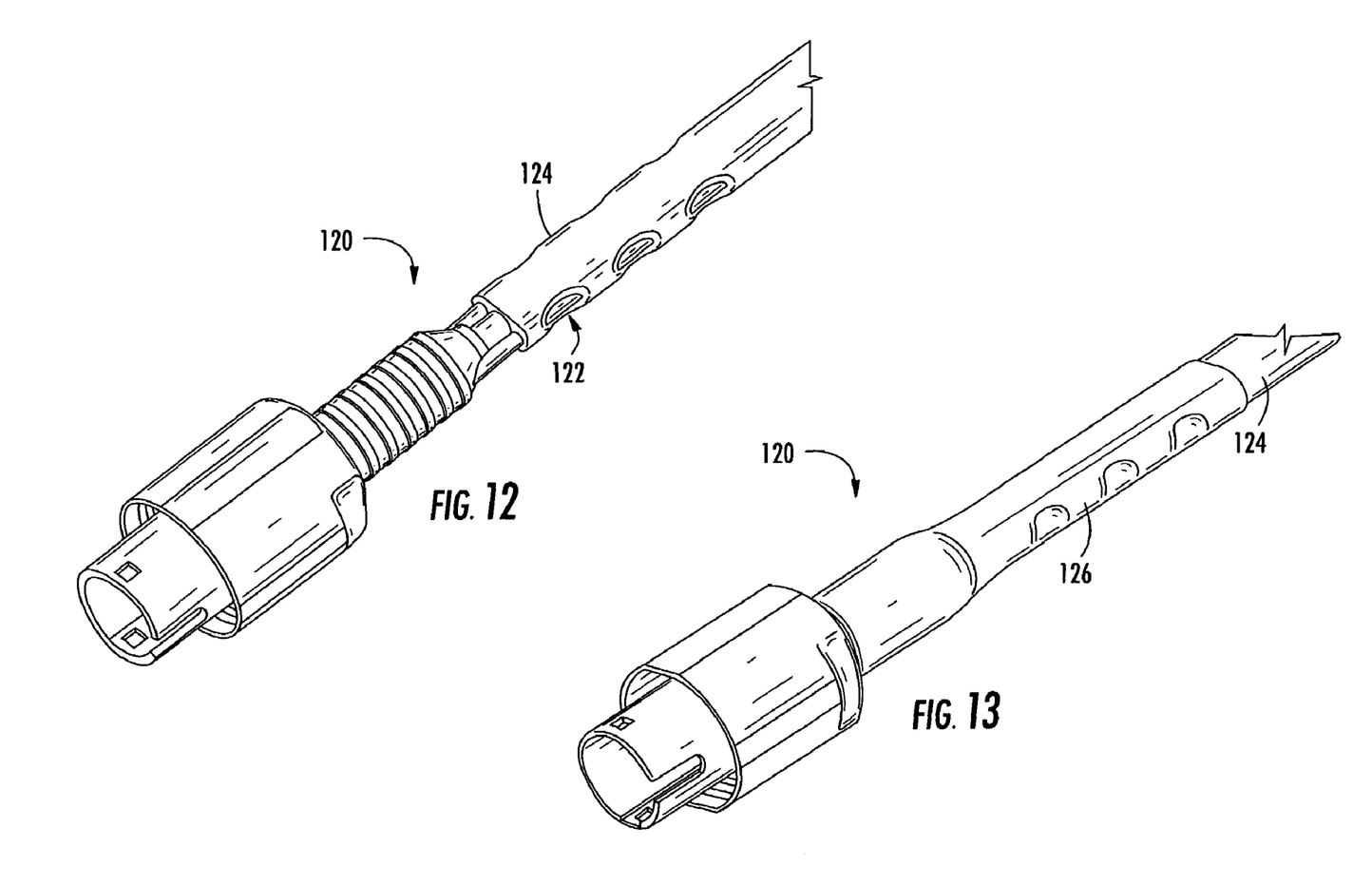
FIG. 12 is a perspective view of a plug assembly including scallops removed from the jacket to aid in drop cable retention to heat shrink.
FIG. 13 is a perspective view of the plug assembly of FIG. 12 including heat shrink.

Referring to FIGS. 12 and 13, an alternative embodiment of a plug assembly 120 is shown that includes, among other components, cuts 122 or scalloping made in a portion of the cable jacket 124 to aid in drop cable retention to heat shrink 126. The heat shrink 126, when shrunk, follows the contour of the scalloped cable sheath, thereby improving retention between the two components.

As will be understood by those skilled in the art, the plug assembly may include and be changed in shape to accommodate any type of fiber optic connector or cable type such as, but not limited to, SC, LC, FC, MTRJ, MTP and other connectors. Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A fiber optic assembly, comprising:
   a fiber optic plug mounted upon an end of a fiber optic cable;
   a pre-molded boot placed over the fiber optic plug and the fiber optic cable;
   a crimp band mated over the pre-molded boot to secure the boot to the fiber optic cable;
   a buffer tube at the end of the fiber optic cable;
   an O-ring located on the buffer tube; and
   an O-ring pusher tube located on the buffer tube behind the O-ring relative to the end of the fiber optic cable, wherein the pusher tube is operable to seat the O-ring between the buffer tube and a crimp body created by the crimp band and pre-molded boot.

2. The fiber optic assembly of claim 1, wherein the pre-molded boot defines an opening therethrough for introducing adhesive.

3. The fiber optic assembly of claim 1, wherein the assembly meets GR-3120-CORE specifications.

4. The fiber optic assembly of claim 1, wherein the boot and crimp band provide sealing and strain relief such that the plug assembly meets GR-3120-CORE specifications.

5. The fiber optic assembly of claim 1, further comprising a strength element engaged between the crimp band and the pre-molded boot.

6. A fiber optic plug assembly, comprising:
   a buffer tube upon an end of a fiber optic cable;
   a plug sub-assembly mounted upon the end of the fiber optic cable over the buffer tube;
   an O-ring located on the buffer tube;
   an O-ring pusher tube located on the buffer tube behind the O-ring relative to the end of the fiber optic cable, wherein the pusher tube is operable to seat the O-ring between the buffer tube and the plug sub-assembly;
   a pre-molded boot placed over the plug sub-assembly and the fiber optic cable; and
   a crimp band mated over the pre-molded boot to secure the boot to the fiber optic cable.

7. The fiber optic plug assembly of claim 6, further comprising:
   the pre-molded boot secured over a rear portion of the plug sub-assembly and an end of the fiber optic cable; and
   a glue body material injected between the buffer tube and a crimp body.

8. The fiber optic plug assembly of claim 6, wherein the fiber optic plug assembly meets GR-3120-CORE specifications.

9. A fiber optic plug assembly, comprising:
   a plug sub-assembly mounted upon a fiber optic cable;
   a plug outer housing located substantially over the plug sub-assembly;
   a pre-molded boot located substantially over the plug sub-assembly and the fiber optic cable;
   a crimp band mated over the pre-molded boot to secure the boot to the fiber optic cable and to seal the fiber optic plug;
   a buffer tube at the end of the fiber optic cable;
   an O-ring located on the buffer tube; and
   an O-ring pusher tube located on the buffer tube behind the O-ring relative to the end of the fiber optic cable, wherein the pusher tube is operable to seat the O-ring between the buffer tube and a crimp body created by the crimp band and pre-molded boot.

10. The fiber optic plug assembly of claim 9, wherein the plug assembly meets GR-3120-CORE specifications.

11. The fiber optic plug assembly of claim 9, further comprising a coupling nut located over the plug outer house and operable to mate with a fiber optic receptacle.

12. The fiber optic plug assembly of claim 9, wherein the pre-molded boot defines an opening therethrough for introducing adhesive.

* * * * *